United States Patent [19]
Zurek et al.

[11] 3,847,256
[45] Nov. 12, 1974

[54] CURRENT COLLECTING SHOE FOR SUSPENSION TYPE VEHICLE

[75] Inventors: Rudolf Zurek; Dieter Modersohn, both of Munich, Germany

[73] Assignee: Krauss-Maffei Aktiengesellschaft, Munich, Germany

[22] Filed: July 20, 1973

[21] Appl. No.: 381,038

[30] Foreign Application Priority Data
July 20, 1972  Germany............................ 2235723

[52] U.S. Cl................ 191/49, 104/148 MS, 191/59
[51] Int. Cl............................. B60l 5/38, B60l 5/08
[58] Field of Search............... 104/148 MS, 148 SS; 191/49, 50, 54, 60.3, 45 R, 59, 59.1

[56] References Cited
UNITED STATES PATENTS

| | | | |
|---|---|---|---|
| 789,340 | 5/1905 | Sperry et al. | 191/49 |
| 869,465 | 10/1907 | Stewart | 191/49 |
| 876,659 | 1/1908 | Prescott | 191/49 |
| 878,106 | 2/1908 | Wooding | 191/49 |
| 881,531 | 3/1908 | Baukat | 191/49 |
| 1,009,767 | 11/1911 | McCoubrie et al. | 191/49 |
| 1,766,639 | 6/1930 | Howe | 191/49 |

*Primary Examiner*—Robert S. Ward, Jr.
*Attorney, Agent, or Firm*—Karl F. Ross; Herbert Dubno

[57] ABSTRACT

An arrangement for electrically communicating between at least one current-carrying rail along a track and a vehicle displaceable along this track, comprising a shoe arrangement in which the contacts are resiliently mounted upon a pivotal plate having a pivotal axis parallel to the direction of displacement of the vehicle on a pair of levers hinged about an axis parallel to the aforementioned pivot axis to the vehicle body. Springs bear upon these levers and are so oriented that the contact pressure remains substantially constant in any position of the contact supports.

12 Claims, 7 Drawing Figures

CURRENT COLLECTING SHOE FOR SUSPENSION TYPE VEHICLE

CROSS-REFERENCE TO RELATED APPLICATIONS

The present application is related to the commonly assigned copending applications Ser. No. 292,173 (now U.S. Pat. No. 3,804,997) and 292,638 filed Sept. 25 and Sept. 27, 1972 respectively.

FIELD OF THE INVENTION

The present invention relates to a current-collector arrangement for vehicles displaceable along a track and, more particularly, to a contact shoe system engageable with a current-carrying rail along the track of a high-speed magnetic-suspension or levitation vehicle.

BACKGROUND OF THE INVENTION

While the communication of electric current between a track-side rail and an electrically powered vehicle is as old as the electrical vehicle art, recent developments in the vehicle field have required rethinking of the problem of communicating electrical energy between the rail and the vehicle.

In earlier wheeled-vehicle systems, a rail was disposed along the track and was engaged by a downwardly or upwardly biased shoe pivotally connected to the vehicle. This system had the disadvantage that high speeds detrimentally affected the contact and that a substantially constant contact pressure could not be maintained. Consequently, in the development of high-speed electric vehicles, e.g. magnetic-suspension or levitation vehicles of the type described in the commonly assigned copending applications ser. No. 268,133 (now U.S. Pat. No. 3,797,403) filed June 3, 1972, Ser. No. 280,073 (now U.S. Pat. No. 3,780,668) and Ser. No. 280.074 both filed Aug. 11, 1972 and Ser. No. 324,131, Ser. No. 324,135 and Ser. No. 324,151, all filed Jan. 16, 1973 significant problems were encountered in attempting to bring about an effective communication of electrical energy from the track to the vehicle.

In such systems, the track may be disposed centrally of the vehicle and can be straddled by the undercarriage thereof while, in another construction, the track has a channel configuration and the undercarriage of the vehicle is received within the interior of the channel. In either case, armature rails are provided on the track for cooperation with electromagnets on the undercarriage of the vehicle to suspend the latter from the track with a minimum of frictional contact. In addition, the track may be provided with one or more reaction rails which cooperate with linear induction motors to propel the vehicle along the track.

For this purpose, communication of electrical energy to the vehicle is a necessity and it has been proposed to provide one or more current-carrying rails along a vertical flank of the central track beam or the uprights of a channel-shaped track beam and to provide contact shoes on the vehicle which slidably engage the current-carrying rails. The systems proposed for this purpose were floatingly mounted so that a self-centering of the shoe arrangement could be achieved and were provided with special linkages so that tractive forces were applied to the contact carrier to hold the contacts against the current-carrying rails. This did not permit the contact shoes to be readily displaced away from the current-carrying rail. Furthermore, as the system is used with higher speeds the contact pressure varies in an undesirable manner.

OBJECTS OF THE INVENTION

It is the principal object of the present invention to provide a current-collector device for the above-described purposes which has a simple construction, which is effective even at the high speeds and which is capable of maintaining a uniform and effective contact between the current-carrying rails and the current-collecting shoes.

Still another object of the invention is to provide a current-pickup device, especially for a magnetic-suspension vehicle, whereby the aforementioned disadvantages are obviated.

SUMMARY OF THE INVENTION

These objects and others which will become apparent hereinafter, are attained in accordance with the present invention by providing the contact shoes upon a pivotal contact carrier whose pivot axis is parallel to the rail and to the direction of displacement of the vehicle and which is mounted at this pivot axis on a pair of levers swingable about a common axis parallel to the pivot axis of the contact carrier. Springs bear upon the levers under tension or compression in such manner as to maintain the contact pressure substantially constant in all angular positions of the assembly about the pivot axis of the levers.

According to the invention, therefore, a plurality of current-carrying rails are provided along a flank of the track and the vehicle is formed with a contact assembly confronting the rails and swingable relatively to the vehicle about an axis parallel to the rails and offset from the contact members. The contacts are pivotally carried on at least one lever which, in turn, is pivotally connected to the vehicle at an axis parallel to the vehicle axis while compression or tension springs are provided to urge the contact assembly toward the rails. The spring means is pivotally mounted on the vehicle body as well as on the lever so that the imaginary line connecting the spring pivot to the lever and the spring pivot to the vehicle in a normal position of the lever intersects an imaginary circle centered on the median point of a line connecting the lever pivot or fulcrum with the spring pivot or fulcrum, the intersection being externally of the triangle formed between the lever pivot and the two spring pivots when the spring is a compression spring but without this triangle when the spring is a tension spring.

Surprisingly this arrangement of the pivots suffices to ensure a substantially constant pressure of the shoes against the rails even upon angular displacement of the shoe assembly relative to the vehicle.

Since the assembly pivots are disposed parallel to but offset in the vertical direction from the rails, the assembly may be swung away from the latter without difficulty and without detaching any part or otherwise requiring special steps.

The advantage of a support for the contact shoes which enables lateral displacement, i.e. displacement transversely to the rail, while maintaining a substantially constant contact pressure in spite of relative movements of the rail and vehicle in the transverse direction, lies not only in the slower wear of the contact members and rail and in the more uniform delivery of electric current to the shoe, but also in enabling the vehicle to move onto branches or spurs or to move away from the track portion on which the rail is mounted in a lateral direction. Such branching systems are described in the aforementioned applications Ser. No. 324,131, 324,135, and 324,151.

The system of the present invention requires no such centering of the contact members with respect to the rail and it has been found to be advantageous to provide the rail with contact faces that lie in vertical plane and are of vertical height sufficient to accommodate all relative vertical positions of the vehicle and the rail. In other words, where the vehicle moves upwardly or downwardly with respect to the current-carrying rail, the width of the rail is at least equal to the excursion of the contact shoes so that the contact shoes always remain engaged with the rail.

According to another feature of the invention, a plurality of rails are provided and the contact shoes are arranged at various levels on the support plate which is pivoted along an axis parallel to the lever-fulcrum axis at the centrum or centroidal axis of the contact or carrying plate. Thus, should the vehicle undergo a yawing movement or a rolling motion, the contact will continue to engage the rails in a mutually parallel manner.

When the tensional compression spring is oriented in the manner described the torque applied to the lever is substantially constant even with deviation of the lever from its normal position to one side or the other. The changes in the effective length of the lever arm may be accommodated by changes in the force applied by the spring so that the product of the force of the effect lever arm, i.e. the torque, remains substantially constant.

This partial compensation within the operating range can be guaranteed by providing the pivot between the spring and the vehicle at such location that the intersection of the imaginary line connecting the spring pivot and the circle on one side of the normal intersection and the intersection on the other side of the normal intersection and the previously described circle lie on the same side of the imaginary line connecting the vehicle pivots (of the lever and spring).

Preferably the spring is a compression spring and forms an acute angle with the lever, the result being a highly compact and space saving construction. The compression or tension spring preferably has a spring constant (restoring force constant) which is tensioned to provide practically the same force dimensions to either side of the normal position of the lever. Under these circumstances, the force change to either side of the normal position in the immediate vicinity thereof is small and hence oscillations are minimized.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
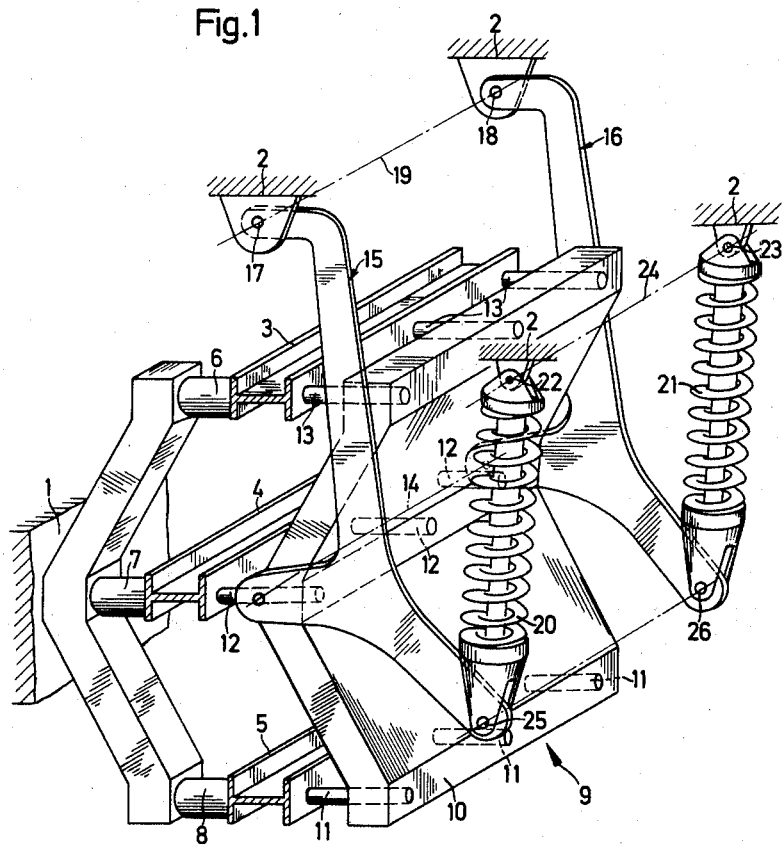
FIG. 1 is a diagrammatic perspective view of a cross-takeup arrangement according to the present invention.

The system illustrated in FIG. 1 is intended for use with a magnetic-suspension vehicle having suspension and lateral guide electromagnets, a linear induction motor etc., all as described in the aforementioned copending applications.

The track 1 of FIG. 1 carrier a magnetic-suspension vehicle 2 and is provided with three current-carrying rails 3, 4, 5 of an alternating current system for energizing the linear induction motor and electromagnet of the magnetic-suspension vehicle 2. The rails 3, 4, 5 of H-cross-section profile steel are mounted upon supporting insulators 6, 7, 8 in respective vehicle planes and upon a V-section bracket. Thus the upper and lower rails 3 and 5 lie laterally beyond the rail 4 in the direction of the vehicle and the contact faces of the rails 3, 5 lie in parallel vertical planes.

The vehicle 2 is provided, according to the invention, with a current-pickup device 9 which comprises a V-section plate 10 of insulating material constituting a contact carrier. Where the vehicle is displaced in the direction of arrow 10a (FIG. 1B) and the wind or air force is applied in the direction of arrow 10b the plate 10 may hae a wedge-shaped configuration with a rounded leading end so that the wind force includes a component urging the plate 10 in the direction of arrow 10c, i.e. toward the rail surface R. Any other arrow dynamic profile with a similar function may be used. In general, the contact carrying plate 10 has a V profile geometrically similar to that of the bracket carrying the rails 3 through 5.

Figure 1A:
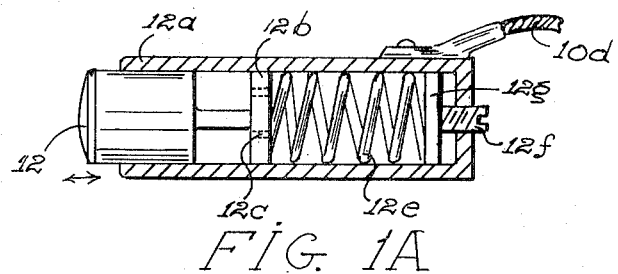
FIG. 1A is an axial cross-sectional view through one of the contact members.
Figure 1B:
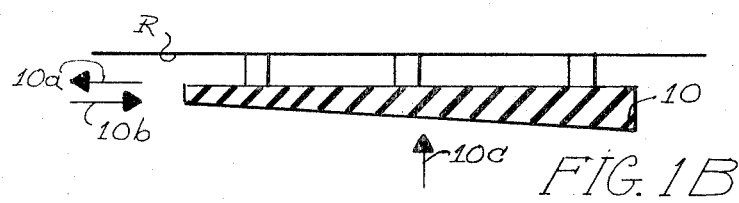
FIG. 1B is a diagrammatic section showing an aerodynamic configuration for the contact members of the present invention.

Rows of contact shoes 11, 12 and 13 (three in each row) are mounted upon the plate 10 and engage the rail 3, 4 or 5 under a spring pressure. The contacts 11 through 13 may be connected by cables 10d (FIG. 1A) in parallel and the the linear induction motor or load. A suitable spring loading arrangement for the contact shoes is shown in FIG. 1A for the shoe 12. The shoe 12 may be axially slideable in a sleeve 12a and can be provided with a piston 12b formed with damping apertures 12c and constituting a seat for a compression spring 12e whose restoring force can be adjusted by a set screw 12f acting upon a plate 12g against which the spring rests. Axial oscillation of the shoe are damped by the piston 12b while the spring 12e holds the contact shoe 12 against the rail surface.

The contact carrier pin is pivotally mounted at its axis 14 (centroidal axis) upon a pair of levers 15, 16 hinged at 17 and 18 at the housing 2 along the axis 19 which is parallel to the axis 14. The axis, in turn, is parallel to the rails 3, 4, 5 and to the rows of contacts 11, 12, 13.

In the normal position of the levers 15, 16, the axis 19 and the axis 14 lie in a common plane parallel to the plate of the contact faces of the rails 3, 4, 5 and preferably in a vertical plane. The centrum axis of the contact carrier 10 lies beneath the fulcrum axis 19 of the three-arm levers 15, 16 so that the various movements of the vehicle having vertical components results in a vertical displacement of the arms and the contact carrier 10 in the vertical plane without angular contribution. The relative movement of the contact carrier 10 and the rails 3–5 is made possible without electrical decoupling because the widths of the rails 3–5 are of a sufficient width to accommodate the vertical movement of the contact members without breaking the contact. The forces applied by the vehicle to the contact carrying plate 10, therefore, are effective at the centroidal axis 14 of the latter.

At the ends of the downwardly inclined third arms of each lever 15, 16, a compression spring 20 or 21 is pivotally connected, the upper pivot of these compression springs being provided on the vehicle at 22, 23. Each of the pivotally anchored compression springs may have a pair of telescoping rods each provided with a spring seat and surrounded by a coil spring acting against the seats. Each seat is formed with an eye to enable pivotal mounting of the compression spring. The spring may be precompressed when introduced into the system illustrated in FIG. 1. Other spring systems, e.g. belleville washer stacks may of course be substituted for the coil spring.

The springs 20 and 21 serve to urge the contact shoes 11, 12, 13 horizontally against the respective rails without material change with variations in the vehicle positions. This is achieved by so positioning the compression springs 20 and 21 that the spring force increases with decreasing effective lever length.

Figure 2A:
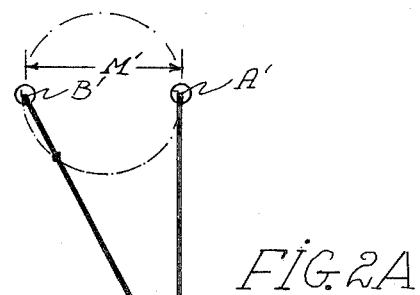
FIG. 2A is a further kinetic diagram illustrating principles of the invention.
Figure 2:
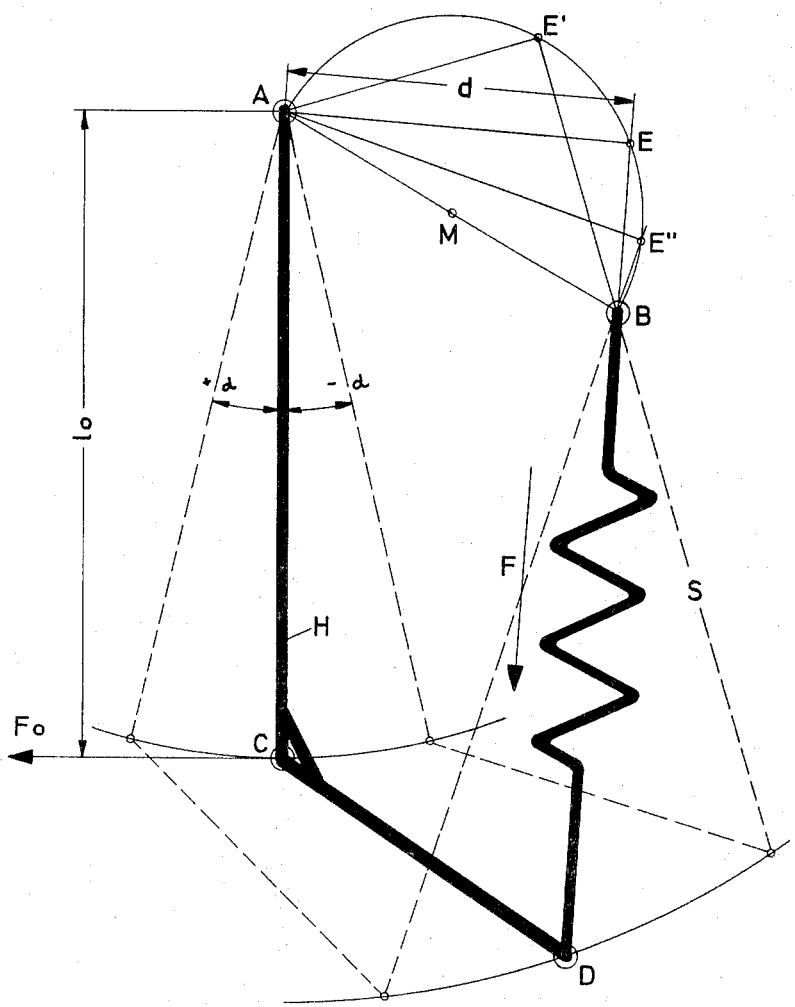
FIG. 2 is a kinetic diagram illustrating the principles of the invention.

FIG. 2 shows the kinematic relationship of the lever spring and pivots in diagrammatic form and in greater detail. At point A, the bent-arm lever 15 or 16, here designated at H is pivotally secured to the vehicle 2. The point C represents the axis 14 at which the contact-carrying body 10 is pivotally mounted upon the levers. At point D, the end of the third leg of the lever, one end of the compression spring arrangement is pivotally connected. Thus point A represents the axis 19 of the vehicle pivots 17, 18 of the lever 15, 16 while point C represents the centroid axis 14 of the contact carrier 10. The contact-pressing force $F_o$ is considered as if it was applied at this point by the levers 15, 16 to the contact carrier 10. The angle ACD is an obtuse angle and is preferably chosen such that in the normal positions of the members of the kinematic system, a practical parallelogrammatic arrangement is provided.

The other pivot for the compression spring is represented at B and the angle ABD is approximately equal to the angle ACD as noted. The spring S is under a force F and is in precompression.

According to the principles of the present invention, the contact applying force $F_o$ is to be maintained substantially constant for all angular displacements $\alpha$ of the lever within a normal range. This requires that the torque $M_o = F_o \cdot L_o$ (1) about the point A. So long as the excursion is relatively small by comparison with the effective lever arm length $L_o$, the force $F_o$ changes only slightly and $\cos \alpha \approx 1$. The torque produced by the compressive force F of the spring S is effective along the lever arm $d$ so that $M = F \cdot d$ (2) and the equations can be combined by use of the relationship $M = M_o$.

The lever angular displacement $\alpha$ changes the effective length of the spring S and thus modifies its force F. Acording to $F = c \cdot f (4)$ wherein $c$ is the spring constant and $f$ is the spring displacement. When the relationship are to be designed so that for all displacements $\alpha$ the torque M is constant, the spring displacement $f$ must be inversely proportional to the change in the effective lever arm and hence $l/d \approx f (5)$.

Figure 3:
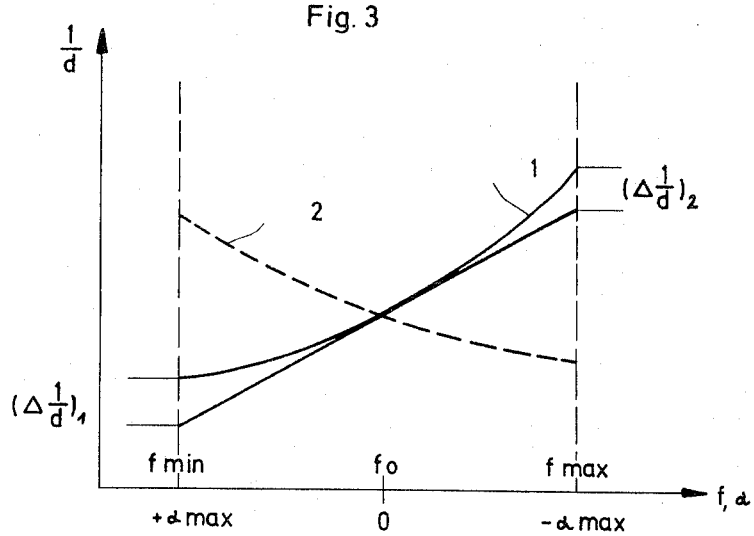
FIG. 3 is the graph showing a dependency of the reciprocal lever arm length and lever position for a compression spring.

From FIG. 3 the relationship between the reciprocal lever arm length ($l/d$), plotted along the ordinate, is seen for the spring displacement $f$ and the angular displacement $\alpha$ of the lever H, both of which are plotted along the abscissa. The appropriate selection of the points A, B, D give the curve 1 which approaches, as can be seen from FIG. 3, a linear relationship between $l/d$ and $f$.

Reverting to FIG. 2, it can be seen that the critical position for the pivot points A, B and D for a compression spring is one in which a line joining the pivot axes A and B has a center M from which a circle can be drawn interconnecting the points A, B. In the rest position of the lever ($\alpha = 0$) the imaginary extension of the spring force line, namely, the line BD intersects the circle externally of the triangle ADB and to one side of the line AB, within the range of displacement $+\alpha$ to $-\alpha$, the intersection point moves from point E' to point E'', i.e. all intersection points within this range lie on the same side of the line AB. The relationship of the dependence, $l/d$ ($f$) in the region $-\alpha$ to $+\alpha$ according to curve 1 does not materially vary. In FIG. 2A there is shown a system in which a tension spring S' is used and its pivot B' to the vehicle lies on the opposite side of the line A'D' of the lever H'. However, in this embodiment the center M' of the line A'B' forms the center of a circle which is intersected by the line B'D' within the triangle A'B'D'.

When all of the intersections lie within the triangle along the line B'D', the relationship $l/d$ ($f$) has the characteristic shown by the curve 2 which is less able to approach linearity but nevertheless is effective.

From the equations 2, 3 and 4 it is possible to deduce a theoretical spring constant $c_{th} = M_o$ ($l/d/f$) (6) so that the spring constant must be a function of the lever displacement $\alpha$, therebeing no linear relationship between the angular displacement $\alpha$ and the reciprocal of the lever arm ($l/d$). The requirements cannot be fulfilled with a simple compression spring having an invariable spring constant and such a spring only approaches the desired level. It is, of course, possible to design spring constants so that they vary as stated above, e.g. by stacking resiliently compressive members of different types.

Figure 4:
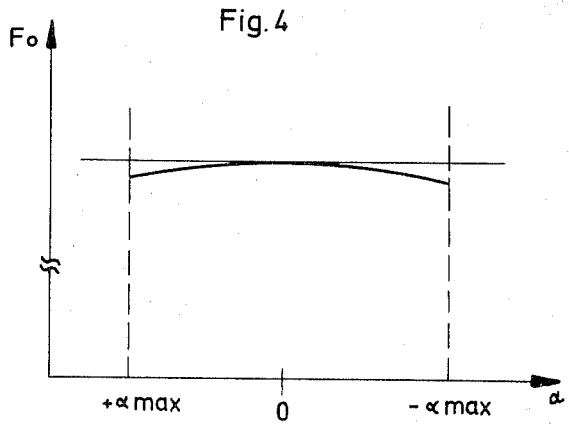
FIG. 4 is a diagram showing the dependency of the spring force and the lever excursion.

However, even if the design of the theoretically optimum spring-constant variation is not practical, it is possible to determine the optimum spring constant and this is shown in FIG. 3 whereby the deviations of the curve 1 from linearity in the vertical direction is $(\Delta l/d)_1$ at $f$ min and $(\Delta l/d)_2$ at $f$ max and both are equal. The slope of this curve, multiplied by the torque $M_o$ gives equation (6) from which the spring constant can be deduced. When the actual spring constant is equal to no less than the theoretical spring constant, the force $F_o$ falls off sharply at the extremities of the displacement $\alpha$ (FIG. 4) but is approximately constant within the range $+\alpha$ max to $-\alpha$ max. Within this range the force $F_o$ may differ from the force at the midpoint of the curve by only several percent.

We claim:

1. A current-pickup system for a track having at least one rail and a vehicle displaceable along said track, said arrangement comprising:
 a contact carrier juxtaposed with said rail and provided with at least one contact engaging same from one side;
 a lever pivotally mounted on said vehicle and engaging said carrier; and
 a spring pivotally connected to said vehicle and to said lever and positioned to urge said carrier toward said rail with a substantially constant force within a range of angular displacement of said lever, said spring being a compression spring and being pivoted to said vehicle at a location spaced from the pivot of said lever and said vehicle whereby an imaginary line between the spring pivots to said vehicle and said lever intersects a circle centered on the middle of a line joining the pivots of said spring and said lever to said vehicle externally of the triangle formed between the pivots of said lever and said spring to said vehicle and the pivot connecting said spring to the lever.

2. The system defined in claim 1 wherein said track is provided with a plurality of parallel rails, said carrier is formed with a plurality of shoes each engaging one of said rails and said carrier is pivotally connected to said lever at the centrum axis thereof.

3. The system defined in claim 2 wherein all of the intersections of the line connecting the spring pivots with said circle lie on the same side of the line connecting the lever and spring pivots at least for an operable range of angular displacement of said lever.

4. The system defined in claim 1 wherein said spring has a spring constant so selected with respect to the positions of said pivots that the contact-pressure drop to each side of the normal position of said lever is substantially constant.

5. The system defined in claim 1 wherein said track is provided with a plurality of rails having contact faces lying in vertical planes and said carrier is provided with a plurality of spring biased contacts engaging said faces.

6. The system defined in claim 5 wherein said carrier is pivotally connected to said lever at the central axis of said carrier, the pivot axis of said carrier to said lever being parallel to the pivot axis of said lever on said vehicle and to said rails.

7. A current-pickup system for a track having at least one rail and a vehicle displaceable along said track, said arrangement comprising:
 a contact carrier juxtaposed with said rail and provided with at least one contact engaging same from one side;
 a lever pivotally mounted on said vehicle and engaging said carrier; and
 a spring pivotally connected to said vehicle and to said lever and positioned to urge said carrier toward said rail with a substantially constant force within a range of angular displacement of said lever, said spring being a tension spring and the line connecting said spring pivots intersecting a circle centered on the middle of a line connecting the pivots between said vehicle and the spring and lever within the triangle formed by the vehicle pivots and the pivot connecting said spring to said lever.

8. The system defined in claim 7 wherein said spring has a spring constant so selected with respect to the positions of said pivots that the contact-pressure drop to each side of the normal position of said lever is substantially constant.

9. The system defined in claim 7 wherein said track is provided with a plurality of rails having contact faces lying in vertical planes and said carrier is provided with a plurality of spring biased contacts engaging said faces.

10. The system defined in claim 9 wherein said carrier is pivotally connected to said lever at the central axis of said carrier, the pivot axis of said carrier to said lever being parallel to the pivot axis of said lever on said vehicle and to said rails.

11. A current-pickup system for a track having at least one rail and a vehicle displaceable along said track, said arrangement comprising:
 a contact carrier juxtaposed with said rail and provided with at least one contact engaging same from one side;
 a lever pivotally mounted on said vehicle and engaging said carrier; and
 a spring pivotally connected to said vehicle and to said lever and positioned to urge said carrier toward said rail with a substantially constant force within a range of angular displacement of said lever, said track being provided with a plurality of rails having contact faces lying in vertical planes and said carrier being provided with a plurality of spring biased contacts engaging said faces, said carrier being pivotally connected to said lever at the central axis of said carrier, the pivot axis of said carrier to said lever being parallel to the pivot axis of said lever on said vehicle and to said rails, said lever having a pair of arms defining an obtuse angle, said carrier being pivotally connected to said lever substantially between said arms and having its pivot axis lying in a common vertical plane with the pivot axis of said lever to said vehicle in a normal position of said lever.

12. The system defined in claim 11 wherein said vehicle is a magnetic suspension vehicle.

* * * * *